(12) United States Patent
Gleich et al.

(10) Patent No.: US 11,409,990 B1
(45) Date of Patent: Aug. 9, 2022

(54) MACHINE LEARNING ARCHIVE MECHANISM USING IMMUTABLE STORAGE

(71) Applicant: Bottomline Technologies (de) Inc., Portsmouth, NH (US)

(72) Inventors: Warren Gleich, Goffstown, NH (US); Richard A Baker, Jr., West Newbury, MA (US)

(73) Assignee: Bottomline Technologies (de) Inc., Portsmouth, NH (US)

( * ) Notice: Subject to any disclaimer, the term of this patent is extended or adjusted under 35 U.S.C. 154(b) by 720 days.

(21) Appl. No.: 16/289,829

(22) Filed: Mar. 1, 2019

(51) Int. Cl.
| | | |
|---|---|---|
| *G06F 15/16* | (2006.01) | |
| *G06K 9/62* | (2022.01) | |
| *G06N 20/00* | (2019.01) | |
| *G06Q 40/02* | (2012.01) | |
| *G06F 16/11* | (2019.01) | |
| *H04L 67/10* | (2022.01) | |
| *H04L 9/06* | (2006.01) | |
| *H04L 9/00* | (2022.01) | |

(52) U.S. Cl.
CPC .......... *G06K 9/6257* (2013.01); *G06F 16/113* (2019.01); *G06N 20/00* (2019.01); *G06Q 40/02* (2013.01); *H04L 9/0637* (2013.01); *H04L 67/10* (2013.01); *H04L 9/50* (2022.05)

(58) Field of Classification Search
CPC .... G06K 9/6257; G06N 20/00; G06F 16/113; G06Q 40/02; H04L 9/0637; H04L 67/10; H04L 2209/38
See application file for complete search history.

(56) References Cited

U.S. PATENT DOCUMENTS

| | | |
|---|---|---|
| 5,262,942 A | 11/1993 | Earle |
| 5,729,594 A | 3/1998 | Klingman |
| 5,809,483 A | 9/1998 | Broka et al. |
| 5,815,657 A | 9/1998 | Williams et al. |
| 5,875,108 A | 2/1999 | Hoffberg et al. |
| 5,890,140 A | 3/1999 | Clark et al. |
| 5,913,202 A | 6/1999 | Motoyama |
| 5,970,482 A | 10/1999 | Pham et al. |

(Continued)

FOREIGN PATENT DOCUMENTS

| | | |
|---|---|---|
| AU | 2003288790 A1 | 3/2005 |
| CA | 2756619 A1 | 9/2012 |

(Continued)

OTHER PUBLICATIONS

AccceptEasy, "In-Chat Payments", webpage downloaded from https://www.accepteasy.com/en/in-chat-paymentson Mar. 21, 2019.

(Continued)

*Primary Examiner* — Razu A Miah
(74) *Attorney, Agent, or Firm* — Richard A. Baker, Jr.

(57) ABSTRACT

An apparatus and method for providing an immutable audit trail for machine learning applications is described herein. The audit trail is preserved by recording the machine learning models and data in a data structure in immutable storage such as a WORM device, a cloud storage facility, or in a blockchain. The immutable audit trail is important for providing bank auditors with the reasons for lending or account opening reasons, for example. A graphical user interface is described to allow the archive of machine learning models to be viewed.

12 Claims, 5 Drawing Sheets

(56) References Cited

U.S. PATENT DOCUMENTS

| | | |
|---|---|---|
| 6,023,684 A | 2/2000 | Pearson |
| 6,105,012 A | 8/2000 | Chang et al. |
| 6,141,699 A | 10/2000 | Luzzi et al. |
| 6,151,588 A | 11/2000 | Tozzoli et al. |
| 6,400,996 B1 | 6/2002 | Hoffberg et al. |
| 6,505,175 B1 | 1/2003 | Silverman et al. |
| 6,523,016 B1 | 2/2003 | Michalski |
| 6,675,164 B2 | 1/2004 | Kamath et al. |
| 6,687,693 B2 | 2/2004 | Cereghini et al. |
| 6,708,163 B1 | 3/2004 | Kargupta et al. |
| 6,856,970 B1 | 2/2005 | Campbell et al. |
| 7,092,941 B1 | 8/2006 | Campos |
| 7,308,436 B2 | 12/2007 | Bala et al. |
| D593,579 S | 6/2009 | Thomas |
| 7,617,283 B2 | 11/2009 | Aaron et al. |
| 7,716,590 B1 | 5/2010 | Nathan |
| 7,720,763 B2 | 5/2010 | Campbell et al. |
| 7,725,419 B2 | 5/2010 | Lee et al. |
| 7,805,370 B2 | 9/2010 | Campbell et al. |
| 8,229,875 B2 | 7/2012 | Roychowdhury |
| 8,229,876 B2 | 7/2012 | Roychowdhury |
| 8,429,103 B1 | 4/2013 | Aradhye et al. |
| 8,776,213 B2 | 7/2014 | Mclaughlin et al. |
| 8,990,688 B2 | 3/2015 | Lee et al. |
| 9,003,312 B1 | 4/2015 | Ewe et al. |
| 9,405,427 B2 | 8/2016 | Curtis et al. |
| D766,292 S | 9/2016 | Rubio |
| D768,666 S | 10/2016 | Anzures et al. |
| 9,489,627 B2 | 11/2016 | Bala |
| 9,537,848 B2 | 1/2017 | Mclaughlin et al. |
| D780,188 S | 2/2017 | Xiao et al. |
| D783,642 S | 4/2017 | Capela et al. |
| D784,379 S | 4/2017 | Pigg et al. |
| D784,381 S | 4/2017 | Mcconnell et al. |
| D785,657 S | 5/2017 | Mcconnell et al. |
| 9,667,609 B2 | 5/2017 | Mclaughlin et al. |
| D790,580 S | 6/2017 | Hatzikostas |
| D791,161 S | 7/2017 | Hatzikostas |
| D803,238 S | 11/2017 | Anzures et al. |
| D814,490 S | 4/2018 | Bell |
| 9,946,995 B2 | 4/2018 | Dwyer et al. |
| 10,262,235 B1 | 4/2019 | Chen et al. |
| D853,424 S | 7/2019 | Maier et al. |
| 10,423,948 B1 | 9/2019 | Wilson et al. |
| D871,444 S | 12/2019 | Christiana et al. |
| D872,114 S | 1/2020 | Schuster |
| D873,277 S | 1/2020 | Anzures et al. |
| D878,385 S | 3/2020 | Medrano et al. |
| D884,003 S | 5/2020 | Son et al. |
| D900,847 S | 11/2020 | Saltik |
| D901,528 S | 11/2020 | Maier et al. |
| D901,530 S | 11/2020 | Maier et al. |
| D902,957 S | 11/2020 | Cook et al. |
| 10,924,514 B1 | 2/2021 | Altman et al. |
| 10,949,825 B1 * | 3/2021 | Brosamer ............... G06Q 30/04 |
| 11,003,999 B1 | 5/2021 | Gil et al. |
| 2002/0016769 A1 | 2/2002 | Barbara et al. |
| 2002/0099638 A1 | 7/2002 | Coffman et al. |
| 2002/0118223 A1 | 8/2002 | Steichen et al. |
| 2002/0135614 A1 | 9/2002 | Bennett |
| 2002/0138431 A1 | 9/2002 | Antonin et al. |
| 2002/0188619 A1 | 12/2002 | Low |
| 2002/0194159 A1 | 12/2002 | Kamath et al. |
| 2003/0041042 A1 | 2/2003 | Cohen et al. |
| 2003/0093366 A1 | 5/2003 | Halper et al. |
| 2003/0184590 A1 | 10/2003 | Will |
| 2003/0212629 A1 | 11/2003 | King |
| 2003/0220844 A1 | 11/2003 | Marnellos et al. |
| 2003/0233305 A1 | 12/2003 | Solomon |
| 2004/0034558 A1 | 2/2004 | Eskandari |
| 2004/0034666 A1 | 2/2004 | Chen |
| 2005/0010575 A1 | 1/2005 | Pennington |
| 2005/0154692 A1 | 7/2005 | Jacobsen et al. |
| 2005/0171811 A1 | 8/2005 | Campbell et al. |
| 2005/0177495 A1 | 8/2005 | Crosson Smith |
| 2005/0177504 A1 | 8/2005 | Crosson Smith |
| 2005/0177521 A1 | 8/2005 | Crosson Smith |
| 2006/0015822 A1 | 1/2006 | Baig et al. |
| 2006/0080245 A1 | 4/2006 | Bahl et al. |
| 2006/0101048 A1 | 5/2006 | Mazzagatti et al. |
| 2006/0190310 A1 | 8/2006 | Gudla et al. |
| 2006/0200767 A1 | 9/2006 | Glaeske et al. |
| 2006/0265662 A1 | 11/2006 | Gertzen |
| 2007/0156673 A1 | 7/2007 | Maga et al. |
| 2007/0266176 A1 | 11/2007 | Wu |
| 2008/0091600 A1 | 4/2008 | Egnatios et al. |
| 2008/0104007 A1 | 5/2008 | Bala |
| 2008/0228751 A1 | 9/2008 | Kenedy et al. |
| 2009/0150814 A1 | 6/2009 | Eyer et al. |
| 2009/0192809 A1 | 7/2009 | Chakraborty et al. |
| 2009/0240647 A1 | 9/2009 | Green et al. |
| 2009/0307176 A1 | 12/2009 | Jeong et al. |
| 2010/0066540 A1 | 3/2010 | Theobald et al. |
| 2011/0302485 A1 | 12/2011 | D'Angelo et al. |
| 2012/0041683 A1 | 2/2012 | Vaske et al. |
| 2012/0054095 A1 | 3/2012 | Lesandro et al. |
| 2012/0072925 A1 | 3/2012 | Jenkins et al. |
| 2012/0197795 A1 | 8/2012 | Campbell et al. |
| 2012/0290379 A1 | 11/2012 | Hoke et al. |
| 2012/0290382 A1 | 11/2012 | Martin et al. |
| 2012/0290474 A1 | 11/2012 | Hoke |
| 2012/0290479 A1 | 11/2012 | Hoke et al. |
| 2013/0054306 A1 | 2/2013 | Bhalla et al. |
| 2013/0071816 A1 | 3/2013 | Singh et al. |
| 2013/0110750 A1 | 5/2013 | Newnham et al. |
| 2013/0211937 A1 | 8/2013 | Elbirt et al. |
| 2013/0219277 A1 | 8/2013 | Wang et al. |
| 2013/0231974 A1 | 9/2013 | Harris et al. |
| 2013/0339187 A1 | 12/2013 | Carter |
| 2014/0129457 A1 | 5/2014 | Peeler |
| 2014/0143186 A1 | 5/2014 | Bala |
| 2014/0241609 A1 | 8/2014 | Vigue et al. |
| 2014/0244491 A1 | 8/2014 | Eberle et al. |
| 2014/0258104 A1 | 9/2014 | Harnisch |
| 2014/0279484 A1 | 9/2014 | Dwyer et al. |
| 2014/0317502 A1 | 10/2014 | Brown et al. |
| 2015/0310195 A1 * | 10/2015 | Bailor ..................... G06F 21/45 726/6 |
| 2015/0363801 A1 | 12/2015 | Ramberg et al. |
| 2016/0011755 A1 | 1/2016 | Douek et al. |
| 2016/0086185 A1 | 3/2016 | Adjaoute |
| 2016/0164757 A1 | 6/2016 | Pape |
| 2016/0232546 A1 | 8/2016 | Ranft et al. |
| 2016/0292170 A1 | 10/2016 | Mishra et al. |
| 2017/0019490 A1 | 1/2017 | Poon et al. |
| 2017/0178245 A1 * | 6/2017 | Rodkey ................... G06F 16/00 |
| 2017/0213131 A1 * | 7/2017 | Hammond ................ G06F 8/31 |
| 2018/0005323 A1 | 1/2018 | Grassadonia |
| 2018/0025140 A1 * | 1/2018 | Edelman ............... G06F 21/316 726/7 |
| 2018/0075527 A1 | 3/2018 | Nagla et al. |
| 2018/0253464 A1 * | 9/2018 | Kohli ..................... G06F 16/219 |
| 2018/0285839 A1 * | 10/2018 | Yang ..................... G06Q 20/40 |
| 2018/0337770 A1 | 11/2018 | Angel et al. |
| 2018/0349446 A1 | 12/2018 | Triolo et al. |
| 2019/0122149 A1 | 4/2019 | Caldera et al. |
| 2019/0205977 A1 | 7/2019 | Way et al. |
| 2019/0213660 A1 | 7/2019 | Astrada et al. |
| 2019/0236598 A1 * | 8/2019 | Padmanabhan .... G06Q 20/4016 |
| 2019/0258818 A1 | 8/2019 | Yu et al. |
| 2019/0340847 A1 | 11/2019 | Hendrickson et al. |
| 2019/0379615 A1 * | 12/2019 | Karp ..................... H04L 51/02 |
| 2020/0119905 A1 | 4/2020 | Revankar et al. |
| 2020/0151812 A1 | 5/2020 | Gil et al. |
| 2020/0184017 A1 * | 6/2020 | Batra ..................... G06F 40/295 |
| 2021/0125272 A1 | 4/2021 | Sinharoy |

FOREIGN PATENT DOCUMENTS

| | | |
|---|---|---|
| EP | 3376361 A2 | 9/2018 |
| JP | 57-101980 A | 6/1982 |

(56) References Cited

FOREIGN PATENT DOCUMENTS

WO   2019/021312 A1   1/2019
WO   2020/068784 A1   4/2020

OTHER PUBLICATIONS

AcceptEasy > Public, webpage downloaded from https://plus.google.com/photos/photo/104149983798357617844/6478597596568340146 on Mar. 21, 2019.
Bansal, Nikhil, Avrim Blum, and Shuchi Chawla. "Correlation clustering." Machine Learning 56.1-3 (2004): 89-113.
Bloomberg Terminal, Wikipedia, Feb. 20, 2021, webpage downloaded from https://en.wikipedia.org/wiki/Bloomberg_Terminal on Apr. 27, 2021.
Data mining to reduce churn. Berger, Charles. Target Marketing; Philadelphia 22.8 (Aug. 1999): 26-28.
Distributed Mining of Classification Rules, By Cho and Wuthrich, 2002 http://www.springerlink.com/21nnasudlakyzciv54i5kxz0)/app/home/contribution.asp?referrer=parent&backto=issue,1,6;journal,2,3,31;linkingpublicationresults,1:105441, 1.
Eckoh, "ChatGuard, The only PCI DSS compliant Chat Payment solution", webpage downloaded from https://www.eckoh.com/pci-compliance/agent-assisted-payments/ChatGuard on Mar. 25, 2019.
Finley, Thomas, and Thorsten Joachims. "Supervised clustering with support vector machines." Proceedings of the 22nd international conference on Machine learning, ACM, 2005.
James Wilson, "How to take your UX to a new level with personalization", Medium blog, Oct. 24, 2018, found at https://medium.com/nyc-design/how-to-take-your-ux-to-a-new-level-with-personalization-1579b3ca414c on Jul. 29, 2019.
Jhingran, Ananl, "Moving toward outcome-based intelligence", IDG Contributor Network, Mar. 19, 2018.
Khalid, "Machine Learning Algorithms 101", Feb. 17, 2018 https://towardsml.com/2018/02/17/machine-learning-algorithms-101/ (Year: 2018).
Live chat Screenshols, mylivechal, webpage downloaded May 17, 2021 from https://mylivechal.com/screenshols.aspx.
LiveChat, "Pagato", webpage downloaded from https://www.livechatinc.com/marketplace/apps/pagato/ on Mar. 21, 2019.
ManyChat, "[Updated] Accept Paayments Directly in Facebook Messenger Using ManyChat!", webpage downloaded from https://blog.manychat.com/manychat-payments-using-facebook-messenger/ on Mar. 21, 2019.
Meia et al., Comparing clusterings—an information based distance, Journal of Multivariate Analysis 98 (2007) 873-895.
Mining for gold. Edelstein, Herb. InformationWeek; Manhasset 627 (Apr. 21, 1997): 53-70.
Pagato, "Accept Payments via Chat", webpage downloaded from https://pagato.com/ on Mar. 21, 2019.
PCIpal, "SMS & Web Chat", webpage downloaded from https://www.pcipal.com/us/solutions/sms-web-chat/ on Mar. 21, 2019.
The Clearing House, "U.S. Real-Time Payments Technology Playbook", Version 1.0, Nov. 2016.
Traffic Analysis of a Web Proxy Caching Hierarchy. Anirban Mahanti et al., University of Saskatchewan, IEEE Network, May/Jun. 2000.
Hampton, Nikolai, Understanding the blockchain hype: Why much of it is nothing more than snake oil and spin, Computerworld, Sep. 5, 2016.
McConaghy, Trent, Blockchains for Artificial Intelligence, Medium, Jan. 3, 2017.

* cited by examiner

MACHINE LEARNING ARCHIVE MECHANISM USING IMMUTABLE STORAGE

BACKGROUND

Prior Application

This application is a priority application.

Technical Field

The system, apparatuses and methods described herein generally relate to machine learning techniques, and, in particular, to a mechanism for creating immutable archives.

Description of the Related Art

The banking industry has been criticized in the past for making decisions on lending, account opening and check cashing procedures based on the neighborhoods in which customers resided. This was seen as a form of racism because certain neighborhoods were predominantly filled with one race or another. Since these criticisms, banks and other lending organizations have instituted procedures to assure that their banking activities avoid any type of prejudices. The requirements to fairly conduct banking activities are codified in the Equal Credit Opportunity Act and the Fair Housing Act in the United States.

Up until the last few years, decisions on whether to loan money or open accounts were determined by bank employees who were trained in compliance with Fair Lending expectations. Bank Examiners then audited the banks for compliance.

In recent years, banks have turned to machine learning techniques to combat fraud in lending and in bank account opening. These machine learning algorithms are taught, given data sets of customers along with fraud activates. The machine develops its own algorithms based on the patterns in the data. Since the machine learning focuses solely on the data in the training sets, there is no way to enforce public policy techniques to assure that the Fair Lending rules are in compliance.

For instance, if a certain neighborhood has a high incidence of fraud, the computer, as part of its algorithm to detect fraud clusters and route banking activities away from these areas of fraud, may determine that certain neighborhoods are high fraud risks, and the machine may restrict banking activities in those neighborhoods. There is a potential that this machine learning behavior will open up a bank to accusations of violations of the Fair Lending rules.

To avoid or limit liability, the reasons why an adverse action is taken should be saved so that the evidence of the reasoning behind the decision is retained. The saving of the reasoning must be in a form that prevents modification.

There are a number of techniques using in computing to avoid data loss and to assure the integrity of the data. Write-once-read-many devices such as write only compact disk devices (CR-R) and write only Digital Versatile Disc Recordable (DVD-R) devices provide a hardware solution that creates an immutable record of the data. Microsoft, in their Azure system, has created a Blob storage functionality that includes an immutable parameter that provides a software cloud immutable storage.

Blockchain technology also provides an immutable ability to store the reasoning concerning a decision so that a bank examiner or auditor can double check the decision. Blockchain technology is unmodifiable yet viewable, and can be added to without impacting the previously stored data. This allows new archive information to be added to the chain without impacting the integrity of the previously stored information.

There is a need in the banking industry to provide an immutable archive of the reasoning behind a decision to provide defensible parameters around the decision. The present inventions address these issues.

BRIEF SUMMARY OF THE INVENTION

An apparatus for archiving machine learning models is described herein. The apparatus is made up of a special purpose server with an immutable storage facility connected. The apparatus further includes an application that executes code on the special purpose server that sends data to a machine learning engine receives a result from the machine learning engine. A machine learning model, that is updated generally, is integrated with the machine learning engine. Every time the machine learning model is updated it is stored by the special purpose server in the immutable storage facility.

In some embodiments, the immutable storage facility is a blockchain, or a write-once-read-many storage product, or a software cloud immutable storage. Furthermore, customer data (which could relate to banking) could also be stored in the immutable storage facility by the special purpose server. This data could also include the machine learning result. The customer data could be stored each time the machine learning engine is called by the application. The machine learning model could be updated periodically or whenever the customer data is used to train the machine learning model.

A method for archiving machine learning models is also described here. The method is made up the steps of (1) receiving data from an application at a machine learning engine running on a special purpose server, (2) calling a machine learning model by the machine learning engine, (3) executing the machine learning model using the data to determine a result, (4) returning the result to the machine learning engine and to the application, (5) updating the machine learning model by the special purpose server, and (6) storing the machine learning model in an immutable storage facility when the machine learning model is updated.

The immutable storage facility could be a blockchain, a write-once-read-many storage product, or a software cloud immutable storage in some embodiments of the method. The steps of the method could also include (7) storing customer data in the immutable storage facility by the special purpose server. In some embodiments, the customer data relates to banking. The customer data could be stored each time the machine learning engine is called by the application and could also include the machine learning result. In some embodiments, the machine learning model is updated periodically or when the customer data is used to train the machine learning model.

DETAILED DESCRIPTION

There is a strong need in the machine learning industry to provide an audit trail for machine learning models, so that bank regulators, legal teams, and internal auditors can verify that the decisions by the machine learning software was done without bias.

Figure 1:
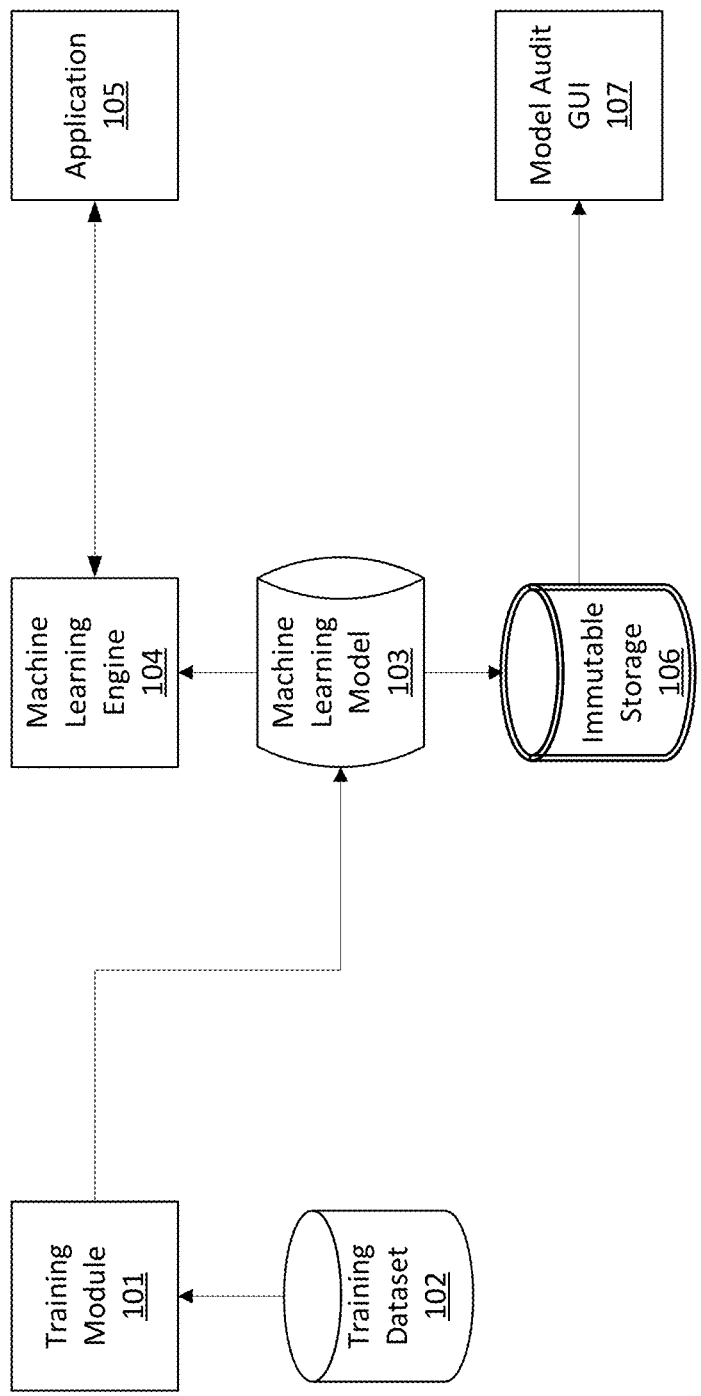
FIG. 1 is a block diagram of a machine learning system.
Figure 5:
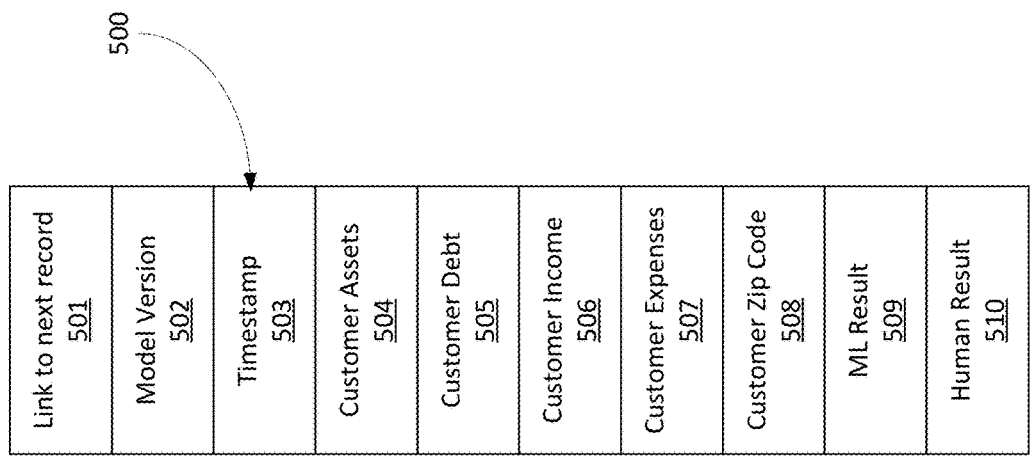
FIG. 5 illustrates a possible data structure for the input to a machine learning model.

FIG. 1 shows a block diagram of a machine learning architecture with the storage of the machine learning model 103 archived in immutable storage 106. The training dataset 102 is first run through a training module 101 to develop the machine learning model 103. As the training module 101 processes the training dataset 102, the training module 101 plots the training data on a multi-dimensional graph and then attempts to create a mathematical model around the dataset. A sample training data set can be seen in the customer information in FIG. 5, items 504, 505, 506, 507, 508 and the result 510.

Figure 2:
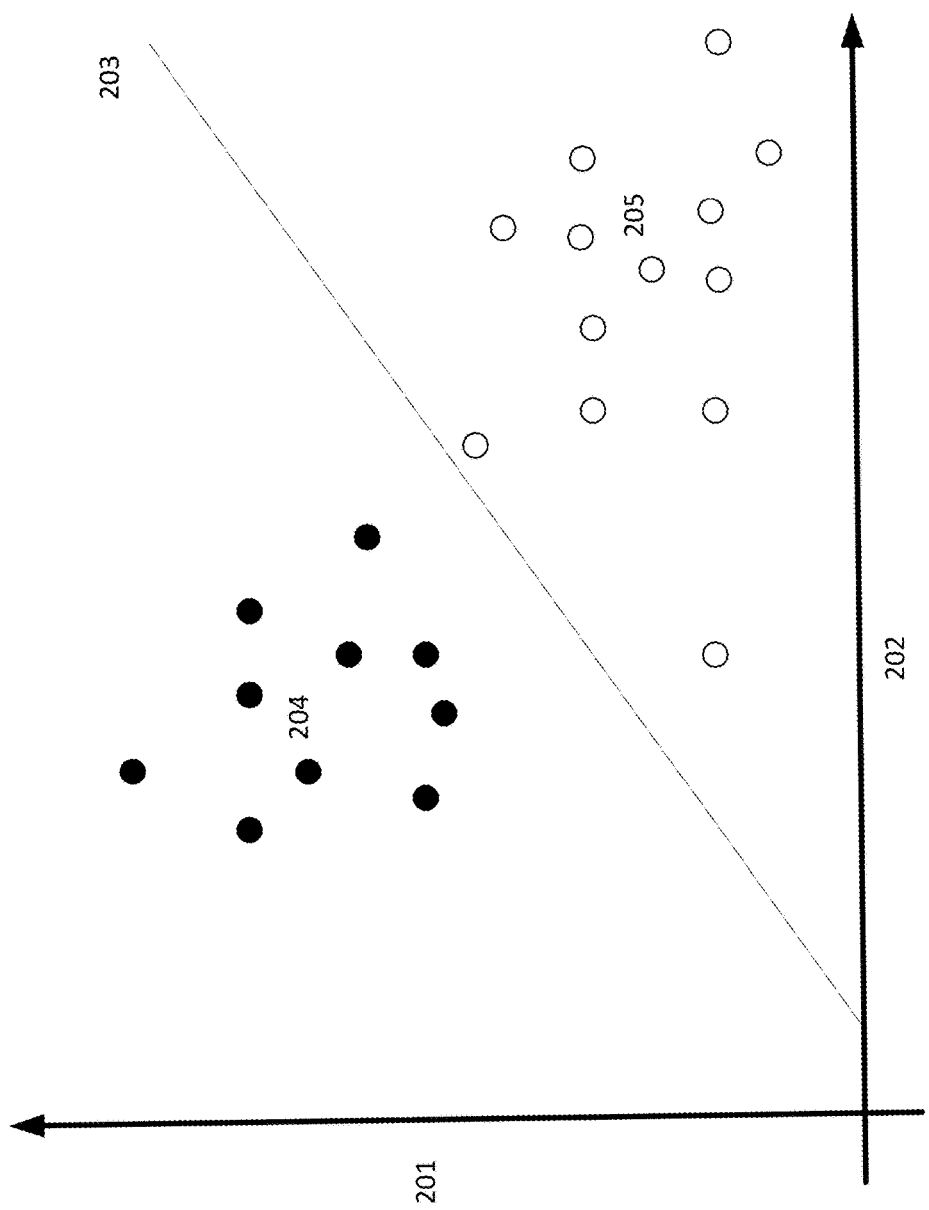
FIG. 2 shows a small data set of simple model.

A sample model is seen in FIG. 2, although displayed in a very simple, two-dimensional form. Positive data 205 and negative data 204 are plotted on an x-axis 202 and a y-axis 201. The data is run through a curve matching algorithm, and the result is a linear equation y=Ax−B, which is shown on FIG. 2 as line 203. For example, the x value could be the customer's assets 504 and the y value could be the customer's income 506. This is a very simple model. Using real world data, the model could be a seven or ten dimensional quadratic equation with scores of constants. To use this model, the machine learning engine function 104 is called. The machine learning engine function 104 returns a Boolean to the application 105 that specifies whether the input parameters x and y predicts positive 205 or negative 204 data. In this case, the machine learning engine function is a one line function: return (y>((A*x)−B)).

For a banking model 103, the input parameters may include such factors as total assets 504, total debt 505, total income 506, total expenses 507, zip code 508, and other criteria, and the model may decide whether to allow or deny a loan. In some uses, the model recommends and a human reviews the model's recommendation (called supervised machine learning), either approving or disapproving the model's result. If the human overrules the machine, the results are fed back into the training set so that the machine/model learns from the mistake.

Every time the model 103 is updated, the model is stored in the immutable storage 106 so that there is an auditable trail of why decisions were made by the machine. The immutable storage 106 could be a form of write once, read many hardware device such as a compact disk devices (CR-R) and write only Digital Versatile Disc Recordable (DVD-R) device. Read only memory chips could also be used in some embodiments. A version of the Secure Digital flash memory card exists in which the internal microprocessor does not allow rewrites of any block of the memory. There are multiple vendors providing Magnetic Storage technologies including (but not limited to) NetApp, EMC Centera, KOM Networks, and others. Prevention of rewrite is done at the physical disk level and cannot be modified or overridden by the attached computer.

Microsoft, in their Azure system, has created a Blob storage functionality that includes an immutable parameter that provides a software cloud immutable storage. Iron Mountain offers a WORM (Write-once-read-many) storage product. Both of these cloud services offer the ability to time limit items in the immutable storage, so that document retention policies can be enforced. Thus, while the stored records are immutable, they also expire after a predetermined time.

Blockchain technology also provides an immutable ability to store the reasoning concerning a decision so that a bank examiner or auditor can double check the decision. Blockchain technology is unmodifiable yet viewable, and can be added to without impacting the previously stored data. This allows new archive information to be added to the chain without impacting the integrity of the previously stored information.

A simple blockchain is nothing more than a list of transactions that is chained or linked together using novel data structures, and some basic cryptographic principles. Anyone can make a blockchain, and create blocks. To create secure, immutable blockchains, the blockchain must be distributed, and the ability to create blocks must be more effort and cost than the value of what is being protected. The rules need to provide mathematical certainty from how transactions are "signed" through to how much "proof of work" needs to accompany a block.

There are many parts to the secure blockchain's rulebook, and each and every part is essential to the scheme's overall security; no single element (including the blockchain) is enough to secure the transactions. The rules ensure that the computing power required to tear out a recent block, alter a transaction, then re-create all subsequent blocks is more than any attacker and even most governments could amass.

Any of these technologies could be used to provide the immutable storage 106. In many embodiments, the training module 101 is run periodically, so the model 103 is updated periodically. This means that a reasonably small number of model 103 versions need to be stored. However, in some embodiments, particularly in supervised machine learning models, the model is updated in real time (or close to real time) as a user corrects the machine's decisions. In these cases the model 103 would need to be stored with high frequency in the immutable storage 106. Special hardware may need to be implemented to store the volume of models 103 and at a performance that can handle the rapidity in which the model 103 changes.

In some embodiments, the data (FIG. 5) from the application 105 is also stored in the immutable storage 106 to allow a complete audit trail of inputs and model changes. This is useful in quality assurance applications to assure that the model behaves the same way when provided a set of test data. This data storage also provides a bank examiner or audit with all of the inputs, models, and outputs for a banking decision, allowing for verification of the reasoning behind the decision.

A model audit graphical user interface 107 could also be provided to review the history of the model changes in the immutable storage 106. This audit GUI 107 could allow search capabilities as well as an ability to list when and how often the model changed. Graphical capabilities to visually present the model are features of some embodiments (i.e. show the curve on an x-, y-, z-axis, similar to FIG. 2).

In addition the audit GUI 107 could be used to reset the model 103 back to a certain time frame to allow selective running of the model with a certain set of data. Another feature could set the model 103 to a certain time or to certain values, allowing the machine learning engine 104 to resume using the GUI 107 selected model 103. This feature is useful if the machine has been incorrectly trained through improper supervised learning, allowing the impact to be reversed by rewinding the model.

The model audit GUI 107 is not permitted to delete or alter the data in the immutable storage 106, although the GUI 107 may be allowed to add to the immutable storage 106 to annotate the model records. This allows comments on why a historical or a new model was forced by the GUI 107 into the machine learning model 103. The GUI 107 could also have facilities for printing or exporting one or more models to another program.

In some embodiments, the data input 504, 505, 506, 507, 508 to the model 103 is also stored in the immutable storage 106. In this embodiment, the GUI 107 could allow the running of a data set or a range of data sets to be run through the current model 103 and the results returned to the GUI 107.

Figure 3:
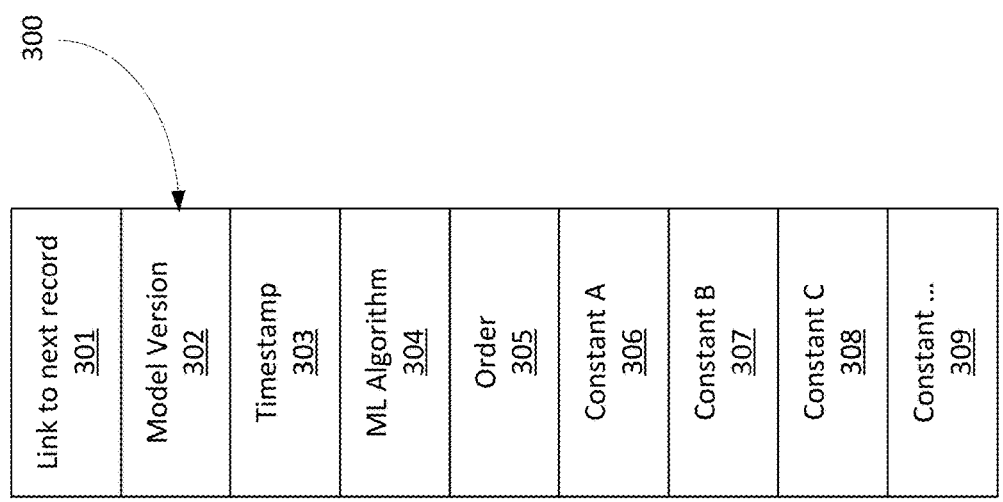
FIG. 3 is one embodiment of a data structure representing a machine learning model.

Looking to FIG. 3, we see one possible embodiment of the model stored in a record 300 in the immutable storage 106. The first data field in the record 300 is a link to the next record 301 in the linked list of records 300. In most embodiments, the next record in the linked list contains the previous version of the model 103 (newest to oldest). In other embodiments, the record sizes could be fixed and the next record 301 would be unnecessary. The next record 301 could run the linked list from the oldest to the newest in other embodiments without detracting from the invention, although buffering techniques would need to be employed to hold the newest record 300 until the next model is to be saved so that the next record link 301 is known before writing. In other embodiments, the location is allocated before use so that it is known when the previous record is stored. In some embodiments, this link 301 is a two element array with one link pointing to the next record and the other link pointing to the previous record. In still another embodiment, a separate table of links to records is stored separate from the data to point to the records.

The next data field in the record 300 is the model version 302. This is an optional field that specifies the version of the model 103 and could simply be an incremented counter.

A timestamp 303 is the next field in the record 300, and records both a time and a data value. The timestamp 303 could be a two element array of the timestamp when the model began use and the timestamp when the model ended use. In other embodiments, either the beginning or ending timestamp is stored, and the other time implied by the previous or next record.

A machine learning algorithm 304 is next stored in the record 300 in this example embodiment. The algorithm 304 could be a string describing the type of curve used or a constant specifying the type of curve or algorithm used. In the example used in FIG. 2 this would be a linear algorithm. In other models could specify a range, a power, a logarithmic, a polynomial, an exponential, a moving average, or a linear forecast algorithms, for example. Combinations or more complicated algorithms could be specified as well.

The next field specifies the order 305 of a polynomial or other formula. This field is not used in all algorithms. This field is in the FIG. 2 example is set to one, because a linear equation is a first order polynomial.

The next four or more fields contain constants 306, 307, 308, 309 for the algorithm. In the FIG. 2 example, constants A and B are used, so field Constant A 306 will have the value of A and field Constant B 307 will have the value of B. The other constant fields 308, 309 are of no concern and could be set to zero or left as random values.

Figure 4:
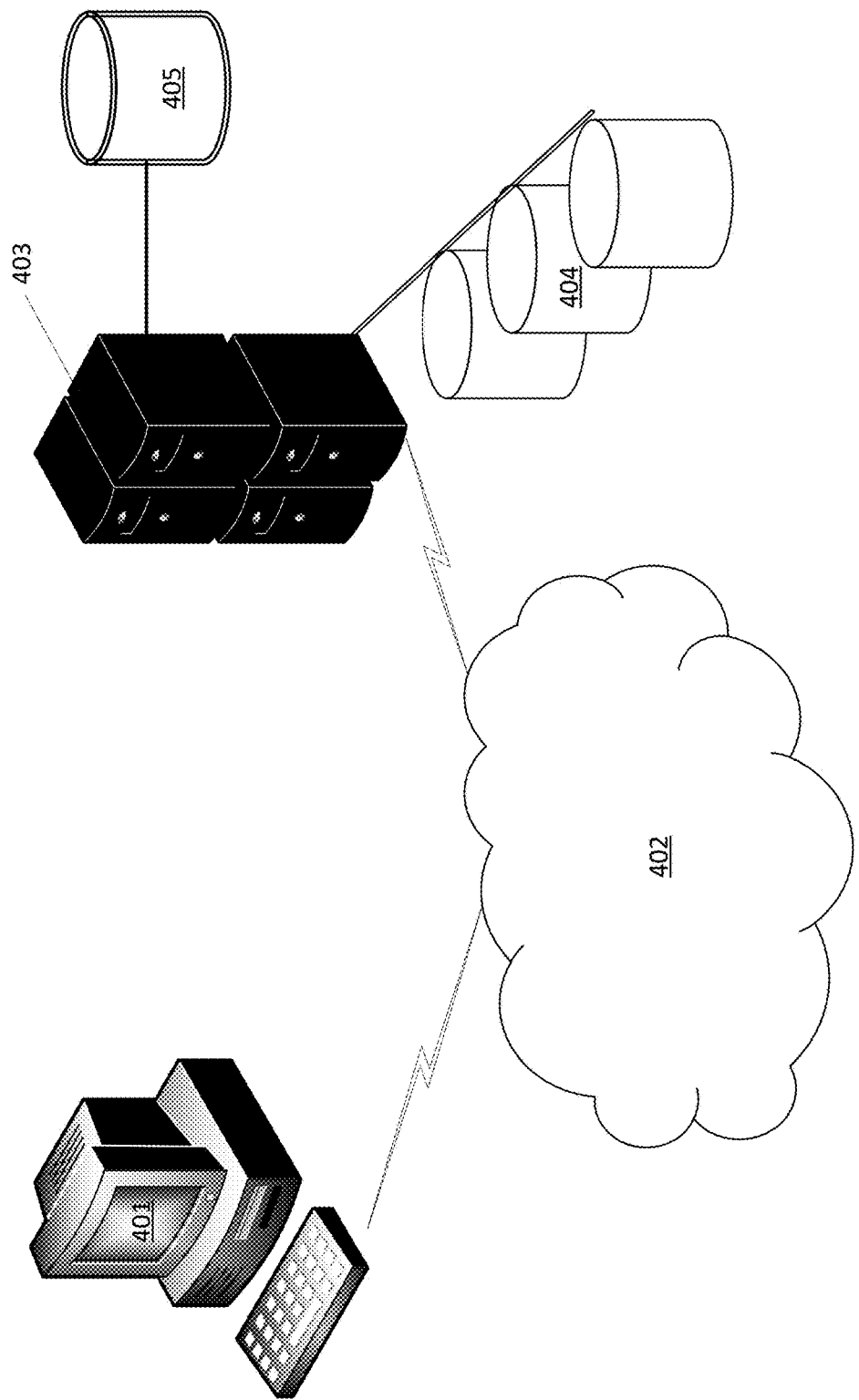
FIG. 4 is an electrical architecture of one embodiment.

Because of the complexities of machine learning algorithms, special purpose computing may be needed to build and execute the machine learning model described herein. FIG. 4 shows one such embodiment. The user views the user interface 107 described here on a personal computing device such as a personal computer, laptop, tablet, smart phone, monitor, or similar device 401. The personal computing device 401 communicated through a network 402 such as the Internet, a local area network, or perhaps through a direct interface to the server 403. The server 403 is a high performance, multi-core computing device with significant storage facilities 404 in order to store the training data 102 for the model 103. Since this training data 102 is continuously updated in some embodiments, this data must be kept online and accessible so that it can be updated. In addition, the real-time editing of the model 103 as the user provides feedback to the model 103 requires significant processing power to rebuild the model as feedback is received.

The server 403 is a high performance computing machine electrically connected to the network 402 and to the storage facilities 404. Furthermore, the server 403 is electrically connected to the immutable storage 405. Immutable storage facilities 405 are not common to most servers 403, but are used in the inventions described herein. In some embodiments, the immutable storage 405 is located in the cloud and indirectly connected to the server 403 through a network.

In order to preserve a complete archive of the machine learning transactions, some embodiments will also store all data that is run through the model 103 in the immutable storage 106. This data could look similar to that illustrated in FIG. 5.

The first data field in the record 500 is a link to the next record 501 in the linked list of records 500. In most embodiments, the next record in the linked list contains the previous version of the model 103 (newest to oldest). In other embodiments, the record sizes could be fixed and the next record 501 would be unnecessary. The next record 501 could run the linked list from the oldest to the newest in other embodiments without detracting from the invention, although buffering techniques would need to be employed to hold the newest record 500 until the next model is to be saved so that the next record link 501 is known before writing. In other embodiments, the location is allocated before use so that it is known when the previous record is stored. In some embodiments, this link 501 is a two element array with one link pointing to the next record and the other link pointing to the previous record. In still another embodiment, a separate table of links to records is stored separate from the data to point to the records.

The next data field in the record 500 is the model version 502. This field specifies the version of the model 103 that processed the data 500. In some embodiments, rather than a version number, a link to the immutable storage 106 record 300 for the model is stored in field 502.

A timestamp 303 is the next field in the record 300. The timestamp 303 represents the date and time when the record is processed by the model 103.

After the timestamp field 303, the input parameters for the model are stored: customer assets 504, customer debt 505, customer income 506, customer expenses 507, and customer zip code 508. Any of these customer input fields could be deleted or additional fields added without detracting from the inventions herein. These fields, in most implementations, would be the same fields in the training dataset 102, with the addition of the correct result 510.

The next field that needs to be stored in the data record 500 is the machine learning result 509. This preserves the outcome of the model based on the above customer data set 504, 505, 506, 507, 508. In most embodiments, this value is a Boolean.

The final field is the human result 510. This is the result that a trainer or supervisor of the model 103 gives to the given user dataset 504, 505, 506, 507, 508. If this value does not agree with the machine learning result 509, then the machine model may need to be re-trained using the data. In some embodiments, a comment may be attached to the record 500 to memorialize the trainer's thinking in overriding the model 103. In some machine learning embodiments, the result 510 is not based on a human trainer but on another machine or real-world result. For instance, if the loan approved by the machine learning model defaults, then the result 510 may change to a negative value, and the data used to retrain the model.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. An apparatus for archiving machine learning models, the apparatus comprising:
   a special purpose multi-core server electrically connected to a storage facility;
   a blockchain connected to the special purpose multi-core server;
   an application that executes code on the special purpose multi-core server;
   a machine learning engine that receives data from the application and returns a result to the application; and
   a machine learning model integrated with the machine learning engine, wherein the machine learning model updates periodically;
   wherein the machine learning model is stored in the blockchain by the special purpose multi-core server when the machine learning model is updated.

2. The apparatus of claim 1 further comprising customer data that is stored in the blockchain by the special purpose multi-core server.

3. The apparatus of claim 2 wherein the customer data relates to banking.

4. The apparatus of claim 2 wherein the customer data is stored each time the machine learning engine is called by the application.

5. The apparatus of claim 2 wherein the result is stored in the blockchain by the special purpose multi-core server.

6. The apparatus of claim 2 wherein the machine learning model is updated when the customer data is used to train the machine learning model.

7. An apparatus for archiving machine learning models, the apparatus comprising:
   a special purpose multi-core server;
   a blockchain stored on a write-once-read-many hardware storage facility electrically connected to the special purpose multi-core server;
   an application that executes code on the special purpose multi-core server;
   a machine learning engine that receives data from the application and returns a result to the application; and
   a machine learning model integrated with the machine learning engine, wherein the machine learning model updates periodically;
   wherein the machine learning model is stored in the blockchain stored on the write-once-read-many hardware storage facility by the special purpose multi-core server when the machine learning model is updated.

8. The apparatus of claim 7 further comprising customer data that is stored in the blockchain stored on the write-once-read-many hardware storage facility by the special purpose multi-core server.

9. The apparatus of claim 8 wherein the customer data relates to banking.

10. The apparatus of claim 8 wherein the customer data is stored each time the machine learning engine is called by the application.

11. The apparatus of claim 8 wherein the result is stored in the blockchain of the write-once-read-many hardware storage facility by the special purpose multi-core server.

12. The apparatus of claim 8 wherein the machine learning model is updated when the customer data is used to train the machine learning model.

\* \* \* \* \*